United States Patent [19]
Hiramatsu

[11] Patent Number: 4,829,769
[45] Date of Patent: May 16, 1989

[54] HYDRAULIC TRANSMISSION COUPLING APPARATUS

[75] Inventor: Takeo Hiramatsu, Nagaokakyo, Japan

[73] Assignee: Mitsubishi Jidosha Kogyo Kabushiki Kaisha, Japan

[21] Appl. No.: 54,421

[22] Filed: May 26, 1987

[30] Foreign Application Priority Data

May 28, 1986 [JP] Japan ............................. 61-121228
Feb. 26, 1987 [JP] Japan ............................. 62-41508

[51] Int. Cl.$^4$ ............................................. F16D 31/02
[52] U.S. Cl. ................................... 60/721; 192/60
[58] Field of Search ............... 192/60; 418/173, 224; 74/711; 60/721, 437

[56] References Cited

U.S. PATENT DOCUMENTS

| | | | |
|---|---|---|---|
| 1,105,792 | 8/1914 | Jessen | 192/60 |
| 1,227,910 | 5/1917 | Hubbard | 192/60 |
| 2,132,631 | 10/1938 | Jones | 192/60 |
| 2,498,801 | 2/1950 | Fraser | 192/60 |
| 2,681,713 | 6/1954 | Chambers | 192/60 |
| 3,184,022 | 5/1965 | Olson | 418/224 |
| 4,727,966 | 3/1988 | Hiramatsu et al. | 74/711 X |

FOREIGN PATENT DOCUMENTS

2596107 9/1987 France ........................ 418/224

Primary Examiner—Carlton R. Croyle
Assistant Examiner—Leonard P. Walnoha
Attorney, Agent, or Firm—Abelman, Frayne, Rezac & Schwab

[57] ABSTRACT

A power transmission apparatus uses a vane pump in which a rotor coupled to a second rotary shaft is rotatably housed in a rotatable housing coupled to a first rotary shaft, and flow of hydraulic operating fluid in the vane pump due to relative rotation of the first and second rotary shafts is regulated to transmit drive force between the first and second rotary shafts. In the power transmission apparatus, small passages are formed in pump chambers defined between the housing and the rotor to permit flow, to a certain extent, of hydraulic operating fluid between delivery side chambers and suction side chambers formed by partitioning the pump chambers by movable vanes mounted in the rotor, thereby preventing fluctuation of torque transmitted between the first and second rotary shafts and preventing occurrence of cavitation in the pump chambers.

4 Claims, 10 Drawing Sheets

HYDRAULIC TRANSMISSION COUPLING APPARATUS

TECHNICAL FIELD OF THE INVENTION

This invention relates to a power transmission apparatus which couples two rotary shafts in a vehicle by means utilizing fluid pressure so as to minimize the rotation speed difference between these two rotary shafts.

BACKGROUND OF THE INVENTION

In U.S. patent application Ser. No. 670,887, the applicant has already proposed a power transmission apparatus which is applied to a vehicle of the kind having its front and rear wheels driven by the same engine. In the proposed power transmission apparatus, a rotary shaft connected with the front wheels is coupled by means utilizing fluid pressure such as oil hydraulic pressure to another rotary shaft connected with the rear wheels.

Figure 13:
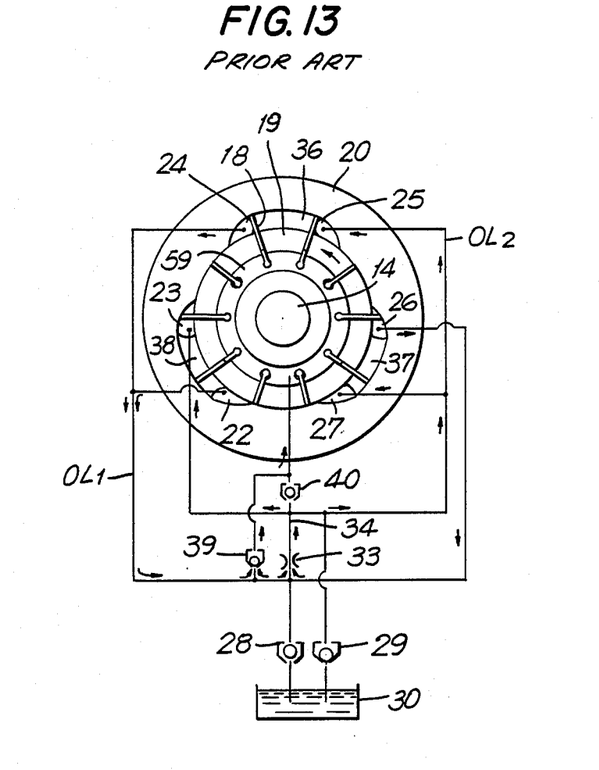
FIG. 13 is a schematic cross-sectional view of a prior art power transmission apparatus.

FIG. 13 is a schematic sectional view of part of the power transmission apparatus proposed in the U.S. Patent Application cited above. Referring to FIG. 13, a housing 20 is coupled to a first rotary shaft connected with front wheels of a vehicle, and a rotor 19 is coupled to a second rotary shaft 14 connected with rear wheels of the vehicle. The rotor 19 is housed in the housing 20. A plurality of movable vanes 18 (10 vanes in this case) protrude from the outer peripheral surface of the rotor 19 to make sliding contact with the inner peripheral surface of the housing 20. A plurality of, or, for example, three pump chambers 36, 37 and 38 are defined between the housing 20 and the rotor 19, and ports 22, 23, 24, 25, 26 and 27 open at both ends of the pump chambers 36, 37 and 38 respectively. The ports 22, 24 and 26 communicate with each other through a first hydraulic oil passage $OL_1$, and the ports 23, 25 and 27 communicate with each other through a second hydraulic oil passage $OL_2$. Check valves 28 and 29 permit flow of hydraulic oil from a hydraulic oil reservoir 30 to the first and second hydraulic oil passages $OL_1$ and $OL_2$ only respectively. An orifice 33 is provided in a hydraulic oil passage 34 through which the first and second hydraulic oil passages $OL_1$ and $OL_2$ communicate with each other.

When there occurs a rotation speed difference between the first rotary shaft and the second rotary shaft 14, that is, between the housing 20 and the rotor 19, and the rotor 19 rotates relative to the housing 20 in a direction as, for example, shown by the arrow in FIG. 13, the ports 22, 24 and 26 act as delivery ports, and the hydraulic oil is delivered by the vanes 18 into the first hydraulic oil passage $OL_1$ from the pump chambers 36, 37 and 38. On the other hand, the ports 23, 25 and 27 act as suction ports, and the hydraulic oil is sucked into the pump chambers 36, 37 and 38 from the second hydraulic oil passage $OL_2$. That is, the element described above operate as a pump. The hydraulic oil delivered into the first hydraulic oil passage $OL_1$ flows into the second hydraulic oil passage $OL_2$ through the hydraulic oil passage 34, and, during flow of the hydraulic oil through the hydraulic oil passage 34, the hydraulic oil flow is encountered with a resistance provided by the orifice 33, which resistance is dependent upon the flow rate of hydraulic oil. Therefore, when a rotation speed difference occurs between the housing 20 and the rotor 19 due to slip occurred between the front wheels and the rear wheels, the resistance corresponding to the flow rate of the hydraulic oil due to the rotation speed difference is added and acts to decrease the rotation speed difference thereby achieving the state of four-wheel drive. Any leakage of hydraulic oil from the sealed parts of the housing 20 and rotor 19 during the above operation is made up by hydraulic oil supplied from the hydraulic oil reservoir 30.

Further, hydraulic oil chambers 59 are provided at portions of the rotor 19 receiving the radially inner ends of the vanes 18 respectively. These hydraulic oil chambers 59 can communicate with the first and second hydraulic oil passages $OL_1$ and $OL_2$ through check valves 39 and 40 which permit flow of hydraulic oil toward the hydraulic oil chamber 59 only. Therefore, when the rotor 19 rotates relative to the housing 20 in the direction shown by the arrow, hydraulic oil delivered from the first hydraulic oil passage $OL_1$ (the second hydraulic oil passage $OL_2$ when the rotor 19 rotates in the opposite direction) is introduced through the check valve 39 (40) into the hydraulic oil chambers 59. Thus, the vanes 18 are forced radially outward and pressed onto the inner peripheral surface of the housing 20 to improve liquid-tightness during the pumping operation.

Figure 14:
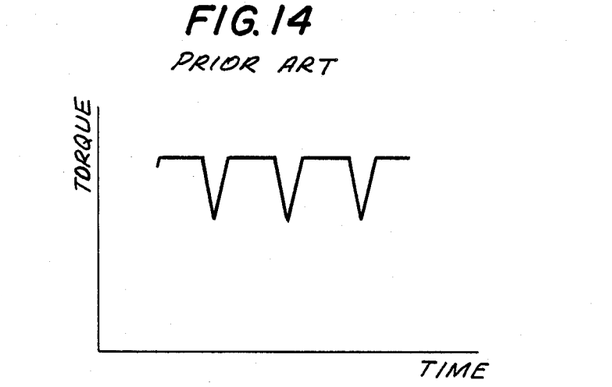
FIG. 14 is a graph showing a transmitted torque variation in the prior art apparatus shown in FIG. 13.

Hydraulic oil delivered from the first or second hydraulic oil passage $OL_1$ or $OL_2$ is introduced into the hydraulic oil chambers 59 in the prior art power transmission apparatus as described above, so as to press the vanes 18 onto the inner peripheral surface of the housing 20 thereby improving liquid-tightness in the pumping operation mode. However, this function has not necessarily been fully exhibited. That is, the arrangement is such that, after feeding all of delivered hydraulic oil into the first hydraulic oil passage $OL_1$ or second hydraulic oil passage $OL_2$ formed in the housing 20, the delivered hydraulic oil is supplied to the second hydraulic oil passage $OL_2$ or first hydraulic oil passage $OL_1$ acting as the suction oil passage and is also introduced into the vane-lifting hydraulic oil chambers 59. Thus, a large quantity of hydraulic operating fluid flows through the circuit including the first hydraulic oil passage $OL_1$ and second hydraulic oil passage $OL_2$. Accordingly, the hydraulic pressure tends to become lower due to the resistance of the oil passages, and the pressure of hydraulic oil supplied to the hydraulic oil chambers 59 becomes lower than that of hydraulic oil delivered from the pump chambers 36, 37 and 38. As a result, the required liquid-tightness may not necessarily be maintained between the vanes 18 and the inner peripheral surface of the housing 20. In such a case, an increase in the pressure of delivered hydraulic oil (the torque-transmission hydraulic oil pressure) beyond a certain value causes radially inward movement of the vanes 18 away from the inner peripheral surface of the housing 20, and leakage of hydraulic oil from the delivery side chambers toward the suction side chambers of the pump chambers gives rise to a variation of the torque being transmitted between the housing 20 and the rotor 19 as shown in FIG. 14.

Further, the pressure of hydraulic oil fed from the delivery ports toward the suction ports through the first hydraulic oil passage $OL_1$ or second hydraulic oil passage $OL_2$ tends to have a large negative value depending on its flow rate. In such a case, cavitation tends to occur in the neighborhood of the ports acting as the suction ports, resulting also in a variation of the torque being transmitted between the housing 20 and the rotor 19.

SUMMARY OF THE INVENTION

With a view to solve the prior art problems pointed out above, it is a primary object of the present invention to provide an improved power transmission apparatus which can stably transmit torque while maintaining the required liquid-tightness for vanes and preventing occurrence of cavitation.

In accordance with the present invention which attains the above object, there is provided a power transmission apparatus comprising a housing coupled to a first rotary shaft, a rotor coupled to a second rotary shaft and rotatably housed in the housing to define pump chambers between it and the housing, a plurality of vanes mounted in the rotor so as to be slidable in the radial direction of the rotor and making sliding contact with an inner peripheral surface of the housing defining the pump chambers thereby partitioning the pump chambers into delivery side chambers and suction side chambers, hydraulic oil chambers formed in the rotor in a relation confronted by the radially inner ends of the vanes to be supplied with hydraulic operating fluid pressurized in the delivery side chambers when the first and second rotary shafts rotate relative to each other, and small passages formed in the pump chambers to permit flow of part of the hydraulic operating fluid from the delivery side chambers toward the suction side chambers.

According to the present invention, the hydraulic operating fluid delivered from the delivery side chambers of the pump chambers is fed mainly through the small passages into the suction side chambers without causing cavitation, and torque is transmitted between the housing (the first rotary shaft) and the rotor (the second rotary shaft) by the fluid pressure resistance added by the small passages. Since the delivered fluid pressure is supplied to the radially inner ends of the vanes by another circuit different from that described above, the flow rate of hydraulic operating fluid flowing through this another circuit is small enough to prevent an undesirable pressure drop. Therefore, the pressure of hydraulic operating fluid fed toward the radially inner ends of the vanes is almost equal to the delivered fluid pressure and forces the vanes radially outward toward the inner peripheral surface of the housing thereby maintaining the required high liquid-tightness during pumping operation.

DETAILED DESCRIPTION OF THE PREFERRED EMBODIMENTS

Preferred embodiments of the present invention will now be described in detail with reference to the drawings.

Figure 1:
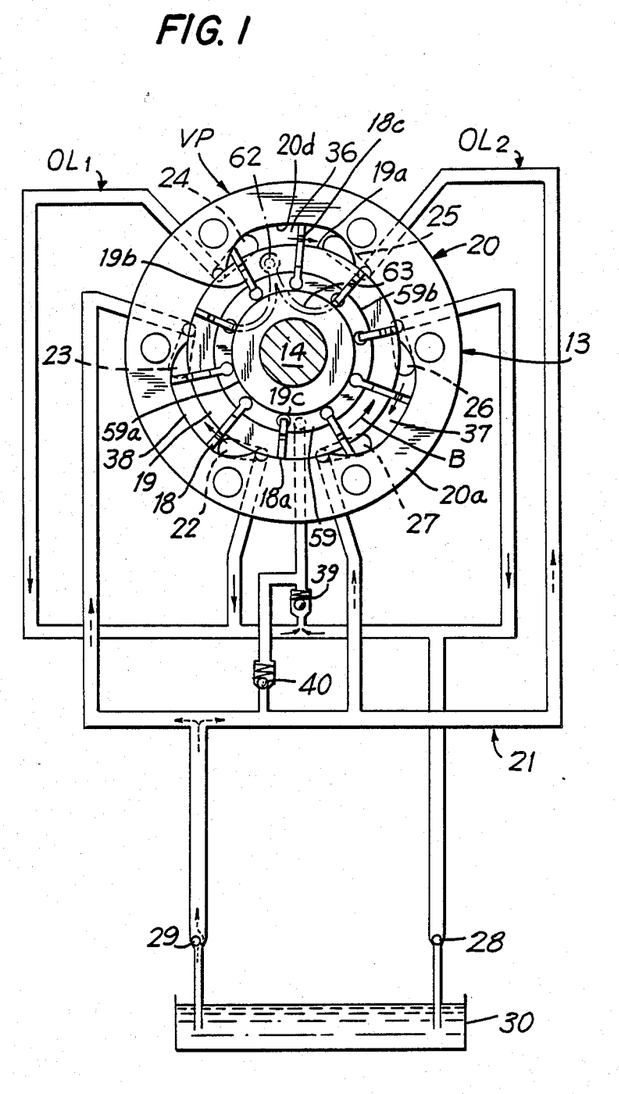
FIG. 1 is a schematic cross-sectional view of an embodiment of the power transmission apparatus according to the present invention.
Figure 2:
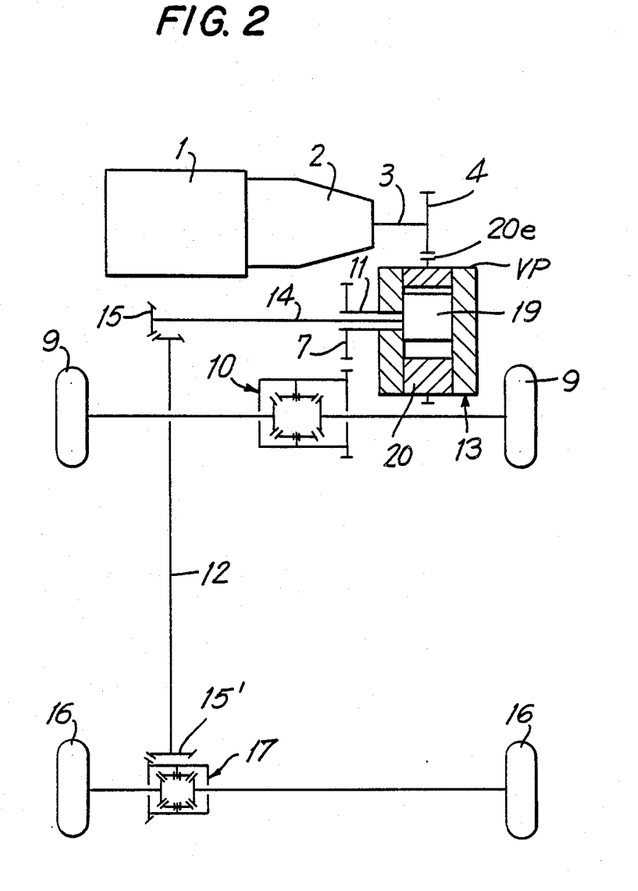
FIG. 2 is a diagrammatic view of a drive system of a vehicle to which the present invention is applied.
Figure 3:
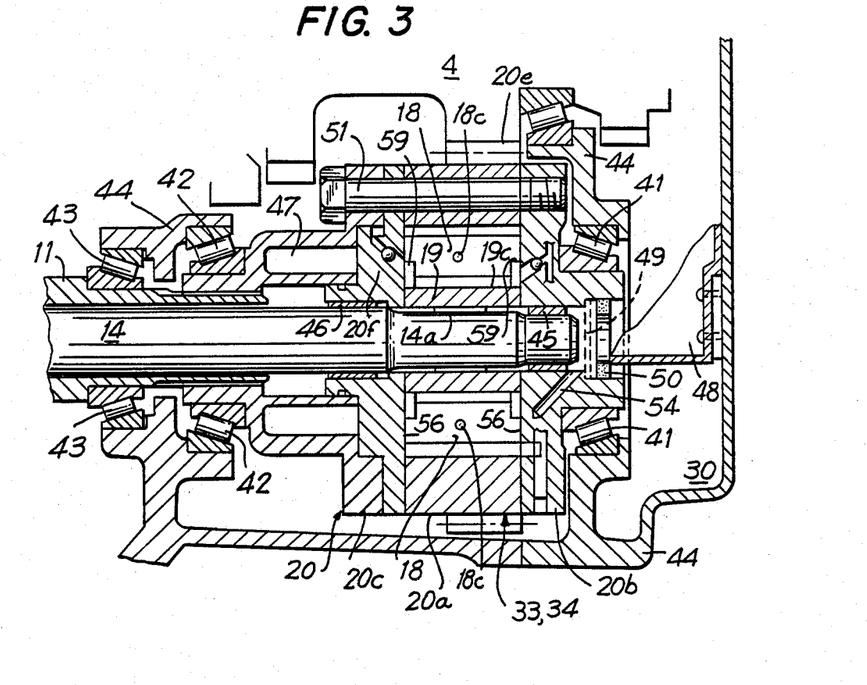
FIG. 3 is a longitudinal sectional view of the power transmission apparatus shown in FIG. 1.

FIG. 1 is a schematic cross-sectional view of an embodiment of the power transmission apparatus of the present invention when applied to a vehicle of four-wheel drive type having a drive system as schematically shown in FIG. 2, and FIG. 3 is a longitudinal sectional view of the power transmission apparatus shown in FIG. 1. In FIG. 1 and 2, like reference numerals and symbols are used to designate like parts appearing in FIG. 13.

Referring to FIG. 2, a transmission mechanism 2 is connected to an engine 1 having a crankshaft extending in the widthwise direction of the vehicle, and an output shaft 3 of the transmission mechanism 2 transmits drive force to a drive gear (or a 4th speed counter gear) 4 mounted thereon. From the drive gear 4, the drive force is transmitted to a cam ring gear 20e of a power transmission apparatus body 13 of a vane pump type.

The cam ring gear 20e drives a housing 20, and, through a first rotary shaft (an outer shaft) 11 coupled to the housing 20, the drive force is transmitted to a gear 7. From the gear 7, the drive force is transmitted to a differential unit 10 for front wheels 9 to drive the front wheels 9.

That is, the drive force transmitted to the power transmission apparatus body 13 is transmitted intact to the first rotary shaft 11 through the cam ring gear 20e and is transmitted then to the front wheels 9 through the gear 7 and differential unit 10.

The drive force transmitted to the power transmission apparatus body 13 is transmitted also to a second rotary shaft (an inner shaft) 14 disposed in coaxial relation with the first rotary shaft 11. The drive force from the second rotary shaft 14 is transmitted through a bevel gear mechanism 15, which changes the direction of power transmission, a propeller shaft 12 and another bevel gear mechanism 15' to a differential unit 17 for rear wheels 16 to drive the rear wheels 16.

As shown in FIGS. 1 and 3, the power transmission apparatus body 13 comprises a vane pump VP and an associated hydraulic circuit 21. A rotor 19 of the vane pump VP is coupled to the second rotary shaft 14 transmitting the drive force to the rear wheels 16. A cam ring 20a and its flange 20c constitute the housing 20 coupled to the first rotary shaft 11 transmitting the drive force to the front wheels 9.

This vane pump VP which functions as a hydraulic oil pump has a plurality of vane receiving grooves 19h (10 vane grooves in this embodiment) formed in equally circumferentially spaced apart relation in an outer peripheral surface 19a of its rotor 19. In each of the vane grooves 19b, a vane 18 is inserted so as to make sliding contact with an inner peripheral surface 20d of the cam ring 20a.

The dimensions of various parts of the vane pump VP are such that axial gaps between a cover 20b of the housing 20 and the vanes 18 and rotor 19 are smaller than a predetermined value. So that discontinuity may not occur in the oil film. Also, the dimensions are such that axial gaps between a pressure retainer 20f of the housing 20 and the vanes 18 and rotor 19 are similarly smaller than a predetermined value. It is so designed that the sum of these gaps is also smaller than a predetermined setting.

The vane pump VP generates a hydraulic pressure proportional to its rotation speed. That is, when relative rotation occurs between the rotor 19 and the cam ring 20a, hence, when relative rotation occurs between the first rotary shaft 11 and the second rotary shaft 14, the vane pump VP functions as a hydraulic oil pump generating a hydraulic pressure. Therefore, by restricting flow of hydraulic oil delivered from the vane pump VP, the rotor 19 and the cam ring 20a can be unitarily rotated by the action of the static pressure of hydraulic oil as if they are a one-piece rigid body.

Three pump chambers 36, 37 and 38 are formed between the cam ring 20 and the rotor 19 in a relation 120° spaced apart from each other around the centerline of rotation. Also, six ports 22, 23, 24, 25, 26 and 27, which act as suction ports when located on the trailing side in the direction of rotation but act as delivery ports when located on the loading side, are formed in a relation spaced apart by about 60° from each other respectively. The 120°-spaced parts 22, 24 and 26 performing the same function and the 120°-spaced ports 23, 25 and 27 performing the same function communicate with each other respectively through a first hydraulic oil passage $OL_1$ and a second hydraulic oil passage $OL_2$.

An orifice 18c acting as a small passage is penetrates each of the vanes 18. With the movement of the vanes 18 in the pump chambers 36 to 38 due to the rotation of the rotor 19 relative to the cam ring 20a, hydraulic oil flows from delivery side chambers toward suction side chambers of the pump chambers 36 to 38 through the orifices 18c. In the first hydraulic oil passage $OL_1$ or the second hydraulic oil passage $OL_2$, there flows only a small quantity of hydraulic oil enough to lift or urge the vanes radially outward as described later. The number or diameter of the orifices 18c is suitably selected according to a torque transmission characteristic described later with reference to FIG. 4. The position of the orifice 18c in each vane 18 is at least such that the orifice 18c is opened when the vane 18 makes it maximum lift in one of the pump chambers 36 to 38.

A hydraulic oil reservoir (an oil tank) 30 formed at the bottom of a transmission casing 44 communicates with the first and second hydraulic oil passages $OL_1$ and $OL_2$ through check valves 28 and 29 respectively. These check valves 28 and 29 permit flow of hydraulic oil from the reservoir 30 to the hydraulic oil passages $OL_1$ and $OL_2$ only.

The cover 20b and flange 20c constituting the housing 20 of the vane pump VP are journalled in respective bearings 41 and 42 in the transmission casing 44.

The second rotary shaft 14 coupled to the rotor 19 of the vane pump VP though a spline engagement part 14a is supported, on both sides of the spline engagement part 14a, in the cover 20h and the pressure retainer 20f through bushings 45 and 46 respectively.

Hydraulic oil pressure is imparted to the radially inner end 18b of each vane 18, and the radially outer end 18a of the vane 18 is pressed onto the inner peripheral surface 29d of the cam ring 20a to maintain the required liquid-tightness. That is, annular hydraulic oil chambers 59 are formed at an axial abutment part 56 where the rotor 19 and the cover 20b abut each other and at another axial abutment part 56 where the rotor 19 and the pressure retainer 20f abut each other, as shown in FIG. 3. These hydraulic oil chambers 59 communicate with the vane receiving grooves 19b of the rotor 19 and can communicate with the first and second hydraulic oil passages $OL_1$ and $OL_2$ through check valves 39 and 40 which permit flow of hydraulic oil toward these chambers 59 only. Therefore, high-pressure hydraulic oil fed from the delivery ports among the ports 22 to 27 to the first or second hydraulic oil passage $OL_1$ or $OL_2$ is introduced into the hydraulic oil chambers 59 through the check valve 39 or 40 to lift or urge the vanes 18 radially outward thereby maintaining the required liquid-tightness.

Five springs 63 or other elements such as rings, as shown by two-dot chain lines in FIG. 1, may be mounted by means such as pins 62 on each end surface of the rotor 19, thereby urging the radially inner ends 18b of the vanes 18 radially outward.

Reference numerals 19c, 43, 47, 48, 49, 50 and 51 in FIGS. 1 and 3 designate an inner bottom part of the rotor 19, a bearing supporting the first rotary shaft 11, a pulsation volume, an oil guide, an oil filter, a magnet, and bolts, respectively.

In the usual straightforward running state of the vehicle, there is not any substantial rotation speed difference between the front wheels 9 and the rear wheels 16, and there occurs no rotation speed difference between the first rotary shaft 11 and the second rotary shaft 14. Accordingly, no hydraulic oil under pressure is delivered from the vane pump VP, and no drive force is transmitted to the rear wheels 16. Thus, the vehicle is driven by the front wheels 9 only.

Figure 4:
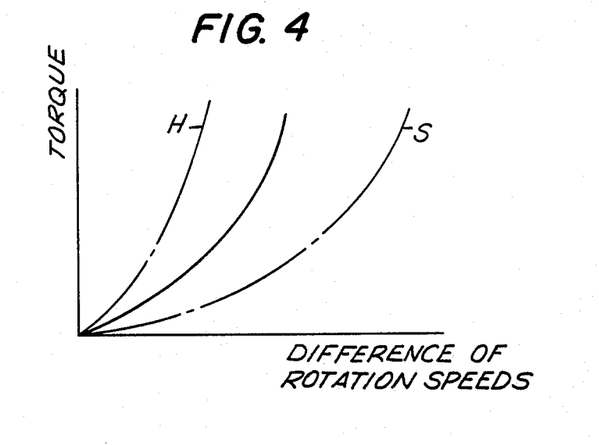
FIG. 4 is a graph showing the relation between the rotation speed difference and the transmitted torque.

When the rotation speed of the front wheels 9 becomes higher than that of the rear wheels 16 due to, for example, occurrence of slip at the front wheels 9, and a rotation speed difference occurs between the first rotary shaft 11 and the second rotary shaft 14, the vane pump VP generates hydraulic pressure to decrease or eliminate the rotation speed difference thereby establishing the four-wheel drive mode. In this case, the rotor 19 rotates relative to the housing 20 in the direction shown by the arrow B in FIG. 1, and the ports 22, 24 and 26 act as delivery ports, while the ports 23, 25 and 27 act as suction ports. In FIG. 1, the solid arrows indicate the direction of flow of hydraulic oil from the delivery ports, while the broken arrows indicate the direction of flow of hydraulic oil to the suction ports. Hydraulic oil flows from the delivery side chambers toward the suction side chambers of the pump chambers 36, 37 and 38 through the orifices 18c. As the rotation speed difference between the first and second rotary shafts 11 and 14 increases to increase the flow rate of hydraulic oil, the resistance against the flow of hydraulic oil through the orifices 18c increases to decrease the rotation speed difference, and the drive force is transmitted to the rear wheels 16 too with a quadric curve-like characteristic as shown in FIG. 4.

By the pressure of hydraulic oil delivered from the ports 22, 24 and 26 and fed into the hydraulic oil chambers 59 through the first hydraulic oil passage $OL_1$ and check valve 39, the radially outer ends of the vanes 18 are pressed onto the inner peripheral surfaces 20d of the cam ring 20a. As described above, the hydraulic oil delivered from the ports 22, 24 and 26 flows almost entirely through the orifices 18c, and the quantity of hydraulic oil supplied directly to the hydraulic oil chambers 59 is small. Therefore, the hydraulic oil, whose pressure is not decreased by the first hydraulic oil passage $OL_1$ and check valve 39 and which remains at the high pressure is introduced into the hydraulic oil chambers 59, so that, by the function of the vanes 18 ensuring a high degree of liquid-tightness, the drive force can be transmitted without causing any torque variation. Further, since hydraulic oil supplied from the delivery side chambers toward the suction side chambers of the pump chambers is not fed through the long hydraulic oil passage such as the first or second hydraulic oil passage $OL_1$ or $OL_2$, unlike the prior art system, occurrence of cavitation at the suction side chambers is prevented to prevent occurrence of any torque variation from this point too. As in the prior art apparatus, leakage of hydraulic oil from the sealed parts of the housing 20 and rotor 19 is made up by hydraulic oil supplied from the hydraulic oil reservoir 30. The characteristic curve showing the relation between the torque and the rotation speed difference in the four-wheel drive mode described above can be made gentle as indicated by the symbol S in FIG. 4. On the contrary, the curve may be made sharp as indicated by the symbol H is FIG. 4. As an example, the diameter of the orifices 18c was 0.5 mm, and the pressure of delivered hydraulic oil at a rotation speed difference of 100 rpm was 200 Kg/cm$^2$ (corresponding to a transmitted torque of 50 Kg.m).

On the other hand, when the rotation speed of the rear wheels 16 becomes conversely larger than that of the front wheels 9, the direction of flow of hydraulic oil in the vane pump VP is opposite to that described above. That is, the ports 22, 24 and 26 act now as the suction ports, while the ports 23, 25 and 27 act now as the delivery ports, and delivered hydraulic oil is fed through the second hydraulic oil passage $OL_2$ and check valve 40 into the hydraulic oil chambers 59 to also establish the four-wheel drive mode in a manner similar to that described above. When the vane pump VP rotates in the reverse direction, dust that may clog the orifice or orifices 18c is automatically removed to facilitate the maintenance.

Figure 5A:
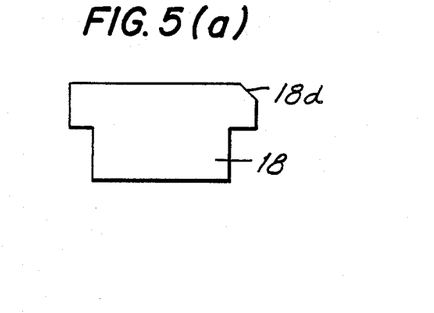
FIG. 5(a) is a front elevation view of another form of the vane.
Figure 5B:
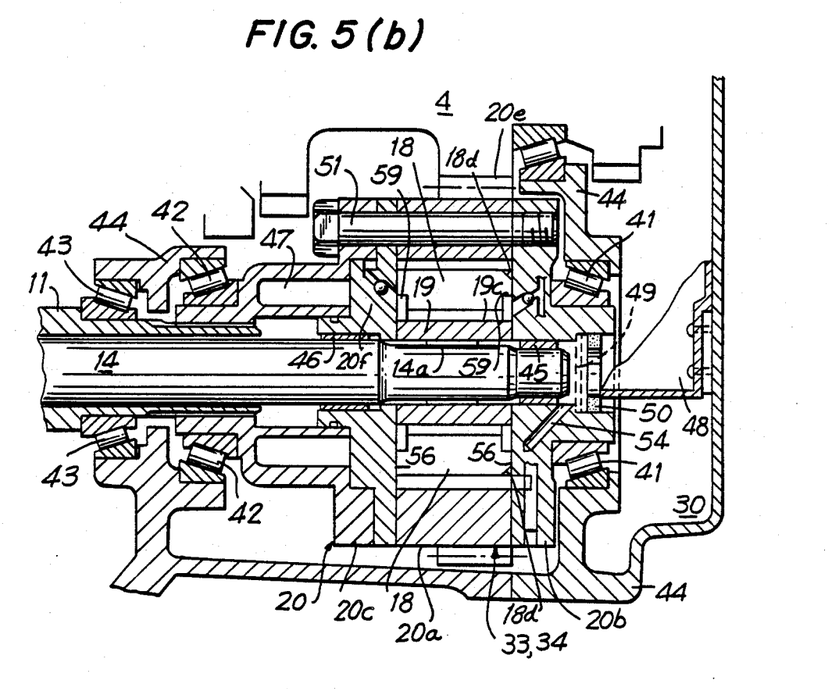
FIG. 5(b) is a longitudinal sectional view of another embodiment of the power transmission apparatus using the vane shown in FIG. 5(a).

FIG. 5(a) is a front elevation view of another form of the vane 18, and FIG. 5(b) is a longitudinal sectional view of another embodiment of the power transmission apparatus using the vane shown in FIG. 5(a). In this power transmission apparatus which is a modification of the first embodiment, a recess 18d is provided at one of the corners of the radially outer end of each of the vane 18 in lieu of provision of the orifice 18c. Thus, small passages permitting flow of hydraulic oil from the delivery side chambers towards the suction side chambers of the pump chambers 36, 37 and 38 are formed at a corner between the inner peripheral surface 20d of the cam ring 20a and the inner wall surface of the cover 20b. The sectional area of each of these recesses 18d corresponds to that of a circle of about 0.3 mm$^2$. By the provision of such small passages 18d, a predetermined resistance is applied against flow of hydraulic oil from the delivery side chambers toward the suction side chambers of the pump chambers 36, 37 and 38 thereby exhibiting the effect equivalent to that exhibited by the orifices 18c. It is apparent that the recess 18d may be provided at a corner of each of the vane 18 opposite to that shown in FIG. 5(c) thereby providing small passages at a corner between the inner peripheral surface 20d of the cam ring 20a and the inner wall surface of the pressure retainer 20f.

Figure 6:
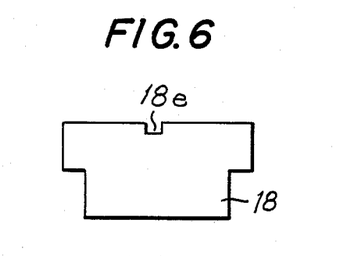
FIG. 6, 7 and 8 are front elevation views of other forms of the vanes formed with a small passage.
Figure 7:
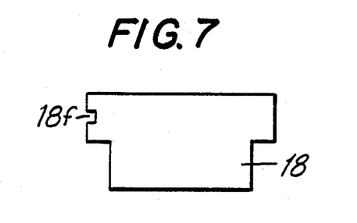
Figure 8:
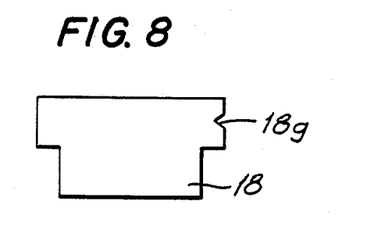

FIGS. 6, 7 and 8 are front elevation views of other forms of the vane 18 employed to form a small passage similar to that described above. In FIG. 6, a recess 18e is provided at a portion of the radially outer end edge of the vane 18, and in FIGS. 7 and 8, recesses 18f and 18g are provided at side edges of the vanes 18 respectively. These recesses 16e, 18f, 18f and 18g exhibit effects equivalent to that exhibited by the recess 18d.

Figure 9:
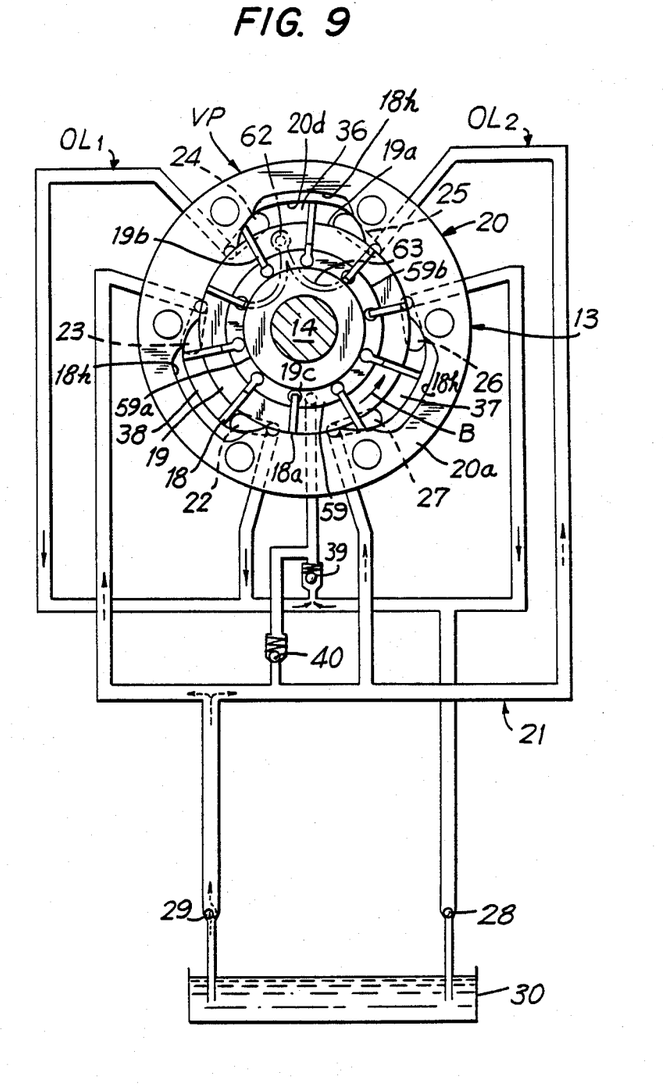
FIG. 9 is a schematic cross-sectional view of still another embodiment of the power transmission apparatus of the present invention.
Figure 10:
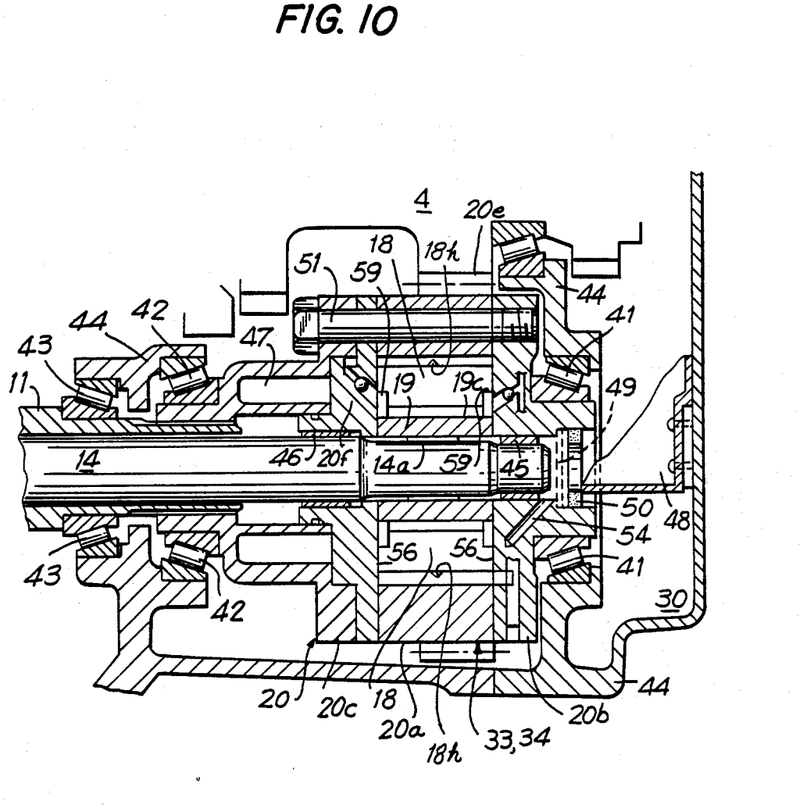
FIG. 10 is a longitudinal sectional view of the power transmission apparatus shown in FIG. 9.

FIG. 9 is a schematic cross-sectional view of still another embodiment of the power transmission apparatus according to the present invention, and FIG. 10 is a longitudinal sectional view of the apparatus shown in FIG. 9. In this embodiment which is a modification of the first embodiment, grooves 18h are formed between the two ports 22-23, 24-25 and 26-27 in the respective pump chambers 36, 37 and 38 on the inner peripheral surface 20d of the cam ring 20a confronting the pump chambers 36 to 38, in lieu of provision of the small passage in each of the vanes 18, thereby forming small passages permitting flow of hydraulic oil from the delivery side chambers toward the suction side chambers of the pump chambers 36, 37 and 38. The sectional area of each of these passages 18h corresponds to that of a circle of about 0.3 mm$^2$, and such small passages apply a predetermined resistance to the flow of hydraulic oil from the delivery side chambers toward the suction side chambers of the pump chambers. The effect of such small passages is equivalent to that of the orifices 18c.

Figure 11:
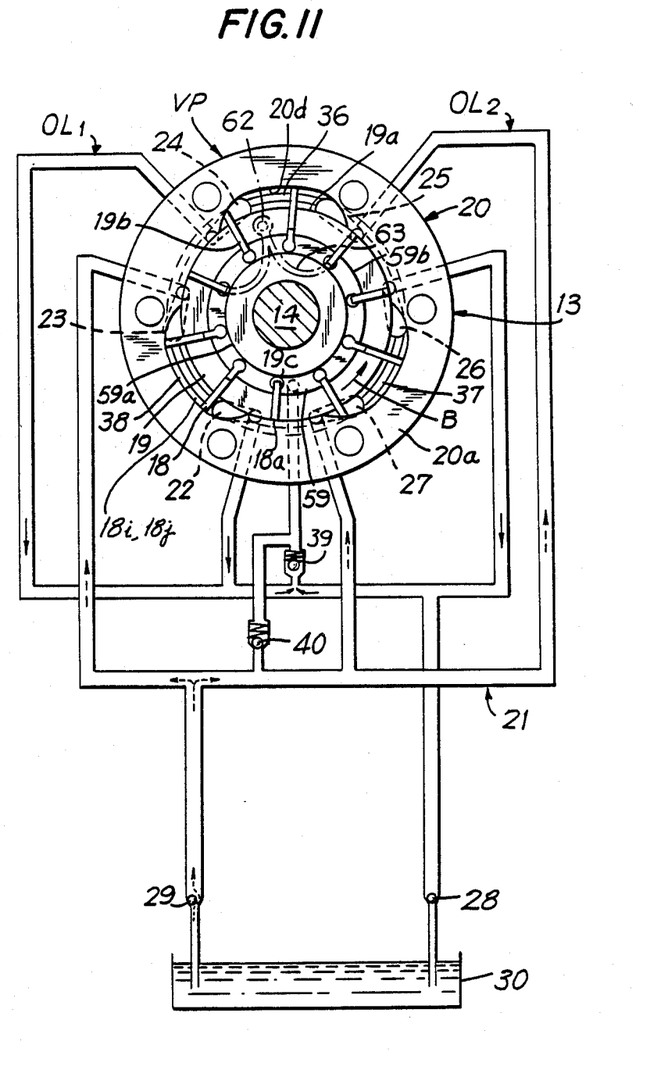
FIG. 11 is a schematic cross-sectional view of yet another embodiment of the power transmission apparatus of the present invention.
Figure 12:
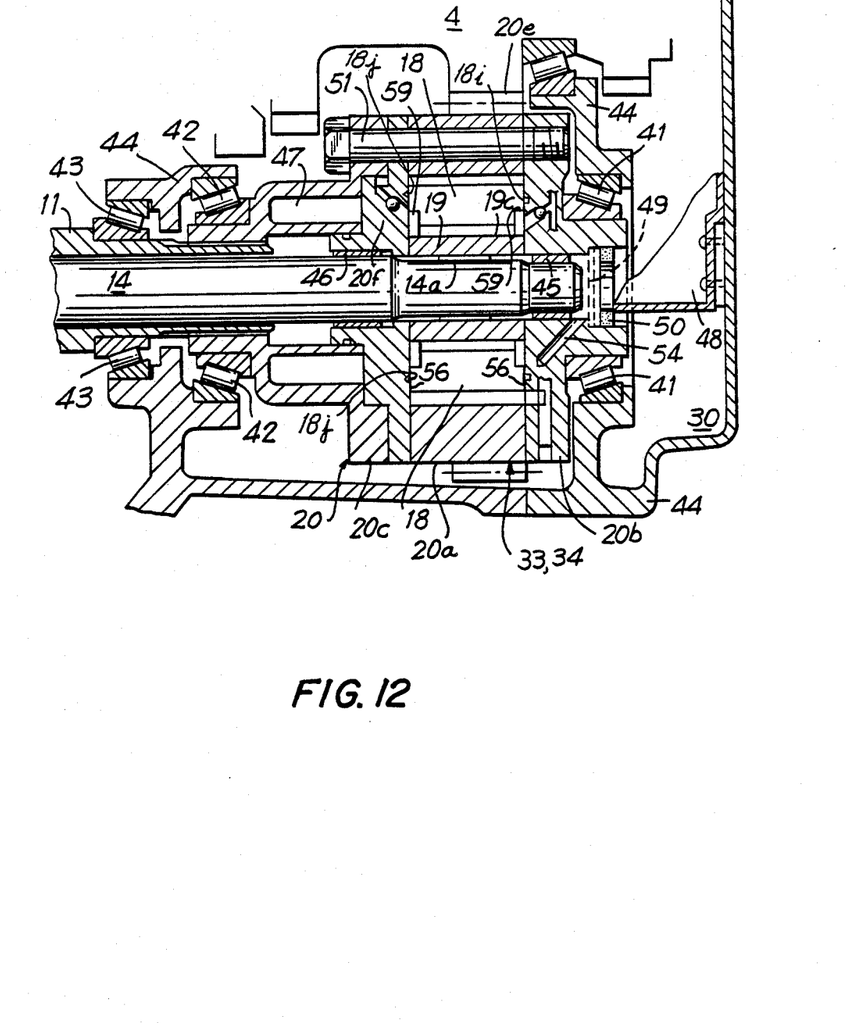
FIG. 12 is a longitudinal sectional view of the power transmission apparatus shown in FIG. 11.

FIG. 11 is a schematic cross-sectional view of yet another embodiment of the power transmission apparatus according to the present invention, and FIG. 12 is a longitudinal sectional view of the apparatus shown in FIG. 12. In this embodiment which is also a modification of the first embodiment, annular grooves 18i are provided on the inner wall surface of the cover 20b or annular grooves 18j are provided on the inner wall surface of the pressure retainer 20f thereby forming small passages permitting flow of hydraulic oil from the delivery side chambers towards the suction side chambers of the pump chambers 36, 37 and 38. Since the grooves 18or 18j in this embodiment are annular in shape, they can be formed easier than the grooves 18h. Although both the grooves 18i and 18j are shown in FIGS. 11 and 12, formation of these two kinds of grooves at the same time is unnecessary.

The small passages may be formed by those other than the orifices 18c, recesses 18d, 18e, 18f, 18g and grooves 18h, 18i, 18j and they may be suitably combined to provide such small passages.

While embodiments of the present invention applied to a vehicle of four-wheel drive type have been described by way of example, it is apparent that the power transmission apparatus of the present invention can also be used for connection of a general power source with a driven vehicle, machine or apparatus.

It will be understood from the foregoing detailed description that, according to the power transmission apparatus of the present invention, fluid pressure (hydraulic oil pressure) almost equal to fluid pressure (hydraulic oil pressure) generated in the pump chambers can be supplied toward the radially inner ends of the vanes. Therefore, transmission of drive force can be attained while automatically decreasing a rotation speed difference between the two shafts in a state in which the vanes maintain required high liquid-tightness, and the torque is free from any variation. Further, because hydraulic operating fluid is supplied from the delivery side chambers toward the suction port chambers of the pump chambers through small passages, generation of a negative pressure in the suction side chambers can be avoided to prevent occurrence of objectionable cavitation. Thus, when the present invention is applied to a vehicle of four-wheel drive type, a four-wheel drive mode can be automatically established by a power transmission apparatus which is small in size, simple in structure and inexpensive.

I claim:

1. In a hydraulic transmission of the type including:
   a cylindrical housing supported for rotation about its longitudinal axis, and having an internal configuration defining a circumferential cam track providing radially extending lobe portions;
   a rotor supported for rotation concentrically within said housing;
   radially extending vanes supported for radial movement within said rotor and extending into contact with said cam track to provide positive and negative pumping chambers in conjunction with said lobes;
   a gallery for hydraulic fluid contained within said rotor and in communication with the radially innermost portions of said vanes;
   conduit means connecting said respective pumping chambers with said gallery; and,
   one-way valve means selectively communicating the positive said ones of said pumping chambers only of said pumping chambers with said gallery, whereby said vanes are forced outwardly into positive contact with said cam track:
   the improvement comprising:
   said positive pumping chambers being in direct communication with said gallery in closed circuit communication therewith to provide maximum hydraulic pressure within said gallery; and,
   bleed-passage means provided in one of said vane and said cylindrical housing and providing for the controlled transfer of hydraulic fluid from a said positive pressure pumping chamber to an adjacent negative pressure pumping chamber, whereby to provide for controlled slippage between said cylindrical housing and said rotor.

2. A power transmission apparatus according to claim 1, wherein each of said bleed passage means is an orifice which penetrates said vane at an area of said vane where said vane protrudes into said pump chamber.

3. A power transmission apparatus according to claim 1, wherein each of said bleed passage means is a recess formed by cutting out part of the outer peripheral edge of said vane at the area of said vane where said vane protrudes into said pump chamber.

4. A power transmission apparatus according to claim 1, wherein each of said bleed passage means is a groove formed on an inner wall surface of each of said pump chambers at a position between two ports provided at both ends of said pump chamber along the direction of rotation of said rotor.

* * * * *